L. D. VON IFFLAND.
APPARATUS FOR DEMONSTRATING THE MOTIONS OF THE EARTH.
APPLICATION FILED MAY 6, 1912.
1,082,334.
Patented Dec. 23, 1913.
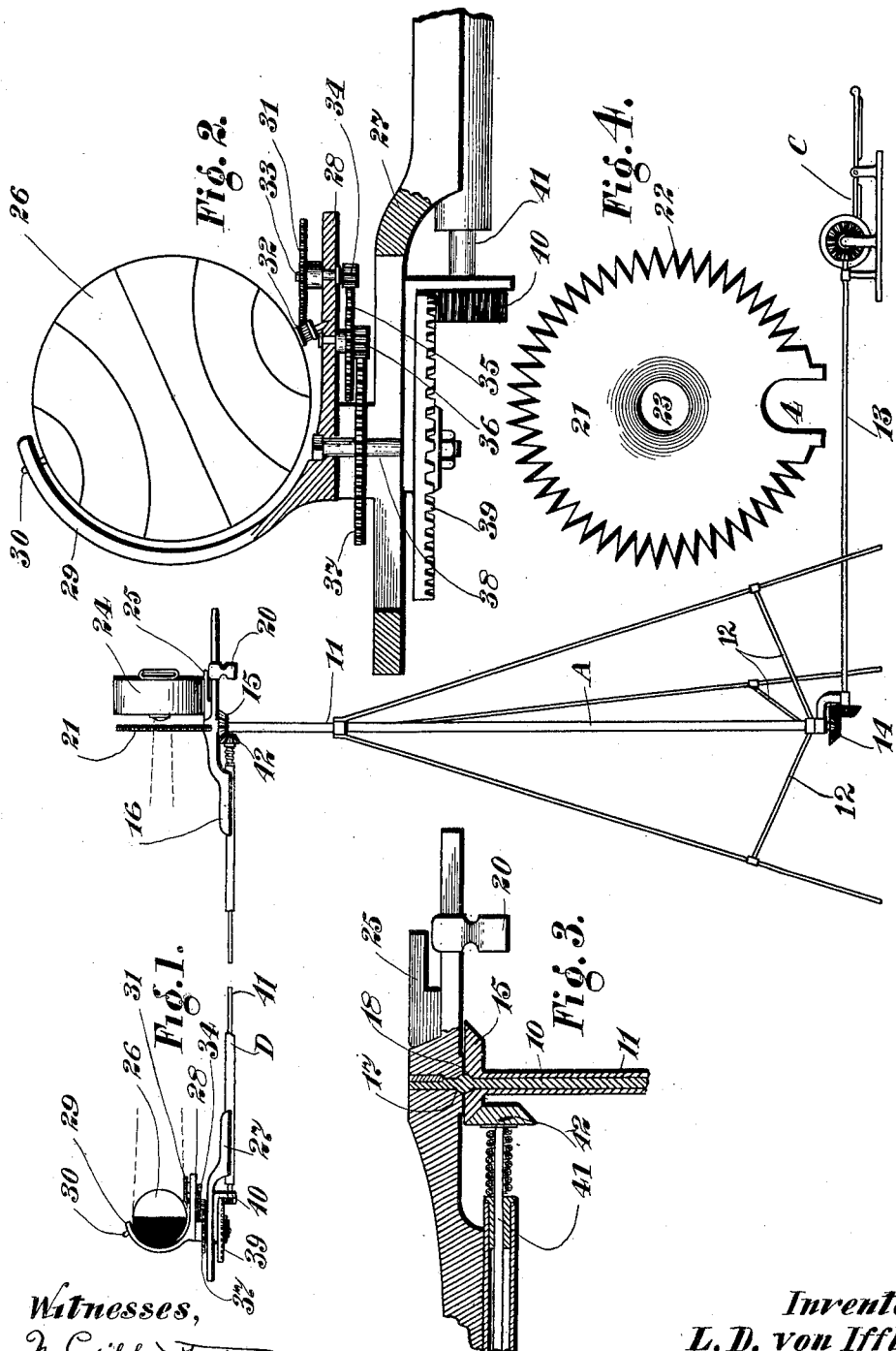
Witnesses,
Inventor
L. D. von Iffland
By _____ Att'y.

UNITED STATES PATENT OFFICE.

LAWRENCE DEWEY von IFFLAND, OF FORT SASKATCHEWAN, ALBERTA, CANADA.

APPARATUS FOR DEMONSTRATING THE MOTIONS OF THE EARTH.

1,082,334. Specification of Letters Patent. Patented Dec. 23, 1913.

Application filed May 6, 1912. Serial No. 695,351.

*To all whom it may concern:*

Be it known that I, LAWRENCE DEWEY VON IFFLAND, of Fort Saskatchewan, in the Province of Alberta, Dominion of Canada, having invented certain new and useful Improvements in Apparatus for Demonstrating the Motions of the Earth, do hereby declare that the following is a full, clear, and exact description of the same.

My invention relates to an improved apparatus for demonstrating all the motions of the earth and the objects of my invention are to provide an extremely simple form of device by means of which the various motions of the earth may be ocularly demonstrated and studied, and further to show which portions of the surface of the earth will be lighted at different seasons by the sun's rays and the relative position of the earth with respect to the sun at different seasons, and it consists essentially of the improved apparatus herein described in detail in the accompanying specification and drawings.

In the drawings: Figure 1 is a side elevation of the apparatus. Fig. 2 is a sectional detail through the supporting means for the globe. Fig. 3 is a sectional detail through the supporting means for the arm. Fig. 4 is a plan view of the sun-disk.

Referring to the drawings, A represents the main standard, and may consist of a vertical shaft 10 rotatable in a hollow casing or continuous bearing 11. A tripod B forms the support for said standard although any other convenient form of supporting means might be used, the standard A being suitably held in the tripod by the radially extending braces 12.

Any suitable means may be employed to rotate the shaft 10, yet in carrying out my invention I preferably employ a foot pedal device C adapted to rotate a horizontal shaft 13 which in turn is geared to a pinion 14 provided on the lower extremity of the shaft 10. Where the instrument is placed upon a table the horizontal shaft may be turned by a simple crank and may be of any convenient length.

A stationary toothed wheel 15 is located on the upper extremity of the casing 11, the function of which will be hereinafter more particularly described.

In order to demonstrate the motions of the earth about the sun, various means may be employed, yet I preferably use a rotatable arm D which revolves about the main standard A, and is adapted to support a globe and disk designed to represent the earth and sun respectively. The specific construction of the arm D and its various parts may be varied considerably but according to my invention, I employ a bracket member keyed to the extremity of the shaft 10 and therefore rotatable therewith, and in order to facilitate the rotation of said bracket the shaft 10 is provided with an enlarged globular portion 17 which forms a suitable ball bearing adapted to rest in a suitable socket 18. The bracket member 16 is further provided with a supporting platform 25 beneath which slides a weight 20 adapted to counterbalance the weight of the earth globe and the supporting arm D therefor.

The element designed to represent the sun which shall be hereinafter described as the sun disk 21, comprises a circular plate provided with a toothed periphery 22 to represent the corona of the sun, and a central aperture 23 through which the rays of an illuminating device 24 are cast, said illuminating device comprising a lamp, electric light or other suitable source of light. The sun disk is secured to the bracket 16 directly in front of the supporting platform 25 for the illuminating device, an engaging hole 4 being provided in the periphery of the disk for that purpose.

The earth globe 26 is mounted on the outer extremity of the arm D, the means preferably employed therefor comprising a bracket member 27 secured to the arm D and adapted to support a rotatable platform 28 which in turn is provided with a semi-circular bracket 29 adapted to support the earth globe 26 on its inclined axis represented by the inclined spindle 30.

In order to give the necessary rotating motion of the earth globe about its inclined axis or spindle 30, a gear 31 is located on the bracket member which rotates the spindle through a pinion 32 mounted thereon. The spindle 33 which carries the gear 31 extends below the bracket member and has a pinion 34 thereon which meshes with a large gear 35 located below the bracket and having a pinion 36 mounted below the same. The pinion 36 meshes with a large gear wheel 37 mounted on the bracket member 27. A bolt or spindle 38 extends down through this wheel 37 and the bracket 27 and has the large toothed wheel 39 mounted thereon meshing with a pinion 40 on the horizontal shaft 41 which extends through the arm D and is provided with a suitable pinion 42 meshing with the toothed wheel on the sleeve 11. The above train of gears is so geared that the earth globe 26 will be rotated 365 times for one complete revolution of the arm D above the standard. As it is also necessary to impart a rotary motion to the earth globe at a constant angle with the plane of its orbit, the platform 28 is caused to rotate about a vertical axis, the means employed for accomplishing this preferably consisting of the spindle 38 which is rigidly secured to the platform 28. Means are also provided for imparting the necessary elliptical motion of the earth globe 26 about the sun disk 21 by locating it eccentrically upon the spindle so that it gradually decreases or increases its distance from the sun disk in the course of its revolution around the same. In order to transmit these motions from the gear 15 to the gear 39 any other suitable means may be employed than that shown.

The operation of the device is as follows: The operator by the use of the pedal device C causes the main shaft 10 to rotate in its tubular casing 11, this rotary movement of said shaft causing the arm D, together with the shaft 41, to revolve about the central shaft 11. During this operation the pinion 42 being held in engagement with the gear 15 causes the globe 26 to be swung inwardly and outwardly thus causing the said globe to take an elliptical path around the sun disk 21. Simultaneously the pinion 42 as it travels around the stationary gear 15 transmits rotation to the horizontal arm shaft 41 which being geared to the bolt or spindle and platform 28, causes the platform to revolve about its vertical axis and the earth globe 26 to rotate at a constant angle with the plane of its orbit.

Thus it is evident that by my device I have produced a means for demonstrating the elliptical course of the earth around the sun, the rotation of the earth at an angle constant with the plane of its orbit, the rotation of the earth about its own inclined axis and lastly the distribution of light on the earth surface at the different locations in its elliptical course around the sun.

As many changes could be made in the above construction and many apparently widely different embodiments of my invention within the scope of the claims constructed without departing from the spirit or scope thereof, it is intended that all matter contained in the accompanying specification and drawings shall be interpreted as illustrative, and not in a limiting sense.

What I claim as my invention is:—

1. An apparatus for demonstrating the motions of the earth comprising a tubular standard, a shaft rotating in the standard provided with a gear, foot operated means for rotating said gear, a bracket rotating with the shaft, an arm adapted to swing with the bracket, means located on the bracket for balancing the arm, a revoluble globe mounted on the arm, a disk mounted on the bracket provided with an aperture and having a toothed periphery, and an illuminating device located behind the aperture.

2. An apparatus for demonstrating the movements of the earth comprising a standard, a shaft carried thereby, means for rotating the shaft, an eccentric gear fixed to the standard, a bracket fixed to the shaft, an arm carried by the bracket, a globe carried by one extremity of the arm, an illuminating device carried by the bracket, means for supporting the globe on an inclined axis, means for revolving the globe about the inclined axis, and means for rotating the globe in an oval path about the standard, said means being carried by the arm and engaging the eccentric gear fixed to the standard.

In witness whereof I have hereunto set my hand in the presence of two witnesses.

LAWRENCE DEWEY von IFFLAND.

Witnesses:
 D. HARPER,
 WM. M. CORBETT.